United States Patent
Schulze-Hagenest et al.

(10) Patent No.: US 7,326,507 B2
(45) Date of Patent: Feb. 5, 2008

(54) PREPARATION OF A TONER FOR REPRODUCING A METALLIC HUE AND THE TONER

(75) Inventors: Detlef Schulze-Hagenest, Molfsee (DE); Udo Dräger, Speyer (DE); Dinesh Tyagi, Fairport, NY (US)

(73) Assignee: Eastman Kodak Company, Rochester, NY (US)

(*) Notice: Subject to any disclaimer, the term of this patent is extended or adjusted under 35 U.S.C. 154(b) by 269 days.

(21) Appl. No.: 11/043,541

(22) Filed: Jan. 26, 2005

(65) Prior Publication Data

US 2005/0214666 A1 Sep. 29, 2005

Related U.S. Application Data

(60) Provisional application No. 60/540,529, filed on Jan. 30, 2004.

(51) Int. Cl.
G03G 9/09 (2006.01)

(52) U.S. Cl. .............. 430/108.1; 430/108.2; 430/108.4; 430/108.8; 428/407; 428/624; 106/403; 106/404

(58) Field of Classification Search .......... 428/407, 428/624; 106/403, 404; 430/108.1, 408.2, 430/408.4, 108.8
See application file for complete search history.

(56) References Cited

U.S. PATENT DOCUMENTS

| | | | |
|---|---|---|---|
| 4,434,009 A * | 2/1984 | Banba | 524/212 |
| 4,750,940 A * | 6/1988 | Higashi et al. | 524/439 |
| 5,126,915 A * | 6/1992 | Pepin et al. | 361/304 |
| 5,180,650 A | 1/1993 | Sacripante et al. | |
| 5,298,356 A | 3/1994 | Tyagi et al. | |
| 6,110,633 A | 8/2000 | Atarashi et al. | |
| 6,342,273 B1 | 1/2002 | Handels et al. | |
| 6,376,147 B1 | 4/2002 | Bonsignore et al. | |
| 2002/0039667 A1 * | 4/2002 | Takaya et al. | 428/692 |
| 2004/0180010 A1 * | 9/2004 | Andes et al. | 424/63 |
| 2005/0162034 A1 * | 7/2005 | Soghomonian | 310/216 |

FOREIGN PATENT DOCUMENTS

| | | |
|---|---|---|
| EP | 0 403 180 | 12/1990 |
| EP | 1 266 946 A1 | 12/2002 |
| JP | 58014141 | 1/1983 |
| JP | 58014142 | 1/1983 |
| JP | 09160298 | 6/1997 |
| WO | 91/04293 | 4/1991 |

OTHER PUBLICATIONS

Dr. Hans-Joerg Kremitz, "Clariant Pigments & Additives for Plastic—Encapsulated Gold Bronze Pigments"; Eckart GmbH & Co., KG, Belden, Germany; pp. 1-6; Internet publication shown as posted Aug. 1, 2003.

* cited by examiner

Primary Examiner—Hoa Van Le
(74) Attorney, Agent, or Firm—Carl F. Ruoff

(57) ABSTRACT

The present invention relates to a toner and process for preparing a toner for reproduction of a metallic, preferably golden or silvery, hue by a printing process, especially for electrophotography. A congeneric process and/or a congeneric toner is preserved with regard to its metallic hue and at the same time not to impair the essential properties of the toner for the printing process in which it is to be used. At least one metallic pigment is provided with a coating of silicate and subsequently with an organic layer and combining the thus obtained particle with toner material.

1 Claim, No Drawings

PREPARATION OF A TONER FOR REPRODUCING A METALLIC HUE AND THE TONER

CROSS-REFERENCE TO RELATED APPLICATION

Reference is made to the commonly assigned, U.S. Provisional Patent Application Ser. No. 60/540,529 filed on Jan. 30, 2004 now abandoned, entitled: PREPARATION OF A TONER FOR REPRODUCING A METALLIC HUE AND THE TONER, the disclosure of which is incorporated herein by reference.

FIELD OF THE INVENTION

The present invention relates to a toner and a process for preparing a toner, for reproduction of a metallic, preferably golden or silvery, hue by a printing process, especially for electrophotography.

BACKGROUND OF THE INVENTION

Printing processes serve not only to reproduce and transmit objective information, but also to convey esthetic impressions, for example when coffee-table books are printed or else in pictorial advertising. An immense problem here is posed in particular by the reproduction of metallic hues. Metallic hues are only imperfectly reproducible by a color mixture formed from primary colors, especially the colors cyan, magenta, yellow, and black (CMYK). A gold tone is particularly difficult to reproduce by means of such a color mixture. It has therefore already been proposed to incorporate metallic pigments or particles in the printing ink in order that a metallic color may be brought about directly. But in the case of toners, where magnetic and/or electrical and especially electrostatic properties are decisive, this is particularly problematic, since metallic constituents may have an adverse effect on these properties. Yet there have already been proposals to imbue toners with metallic constituents. For instance, U.S. Pat. No. 5,180,650, issued on Jan. 19, 1993, discloses providing a toner composition, which contains lightly colored metallic constituents, such as copper, silver or gold for example, in a coating, which in turn has been provided with an over-coating comprised of a metal halide.

But the appearance of prints in particular may be adversely affected by chemical reactions of the metallic constituents due to the halides, which can promote oxidations of the constituents for example. For instance, the tarnishing with which everyone is familiar from copper or silver objects may occur, making the metallic quality unattractive or disappear completely. Moreover, these toners are only lightly metallically colored, which is insufficient to reproduce a gold tone in printed matter. Further, when metallic constituents are incorporated in toners using conventional manufacturing processes, these metallic flakes are randomly oriented throughout the toner particles. This random orientation leads to the loss of metallic hue, and causes a dark appearance when such toners are fixed to a receiver sheet using heated rollers.

SUMMARY OF THE INVENTION

It is an object of the present invention to preserve a congeneric process and/or a congeneric toner with regard to its metallic hue and at the same time not to impair the essential properties of the toner for the printing process in which it is to be used, especially for electrophotography or electrography. It shall preferably be possible to fuse the toner to the printed stock in a non-contact manner, especially with the aid of microwaves, without disruption due to metallic constituents in the toner.

This object can be achieved according to the present invention by several methods. One involves first providing a metallic pigment with a coating of silicate, titanate, or aluminate and subsequently with an organic layer and combining the thus obtained particle with toner material including for example of: polymer, charge control agent, optional colorant, and fumed metal oxide like silica, titania, or aluminia hydrophobically surface coated. Another approach involves providing a coating of an organic layer over the metallic pigment, and combining the resulting particle with toner material consisting of polymer resin, optional charge control agent, and optional fumed metal oxide particles that have been hydrophobized with a coating such as silica, titania, or alumina.

In further developments of the present invention, the organic layer utilizes at least one aliphatic acid, stearic acid, at least one amide of at least one acid, at least one salt of at least one acid, at least one olefinic material and/or at least one natural or synthetic wax. However, the use of stearic acid could give rise to the problem that the stearic acid will plasticize the toner material, and so would need to be done with particular care. The organic layer may include at least one polymer organic layer, such as a polyester, over the silicate, titanate, or aluminate layer. The organic layer could also include any of the polymers that are typically used as toner resins, as described in more detail herein below. In addition, the metallic pigment may have only the organic layer as a coating, which may include at least one polymer, such as polyester.

Otherwise, the process of the present invention can conform to any well-known process for preparing dry toners wherein pigments are conventionally incorporated in a toner core, i.e., for example by compounding, classifying and/or grinding. Instead of embedding pigments in a toner core it is also possible, for example, to utilize a shell construction wherein a pigment is applied to the surface of a toner body, especially as part of a coating, optionally alone or mixed with other ingredients, for example with polymers, waxes, or charge control agents. Illustrative references are U.S. Pat. No. 5,298,356, issued on Mar. 29, 1994 and/or U.S. Pat. No. 6,110,633, issued on Aug. 29, 2000, the disclosures of which are hereby incorporated by reference thereto.

Finally the inventive toner maybe coated with an additional component on the surface consisting of hydrophobic fumed metal oxides like silica, aluminia, or titania in concentrations of about 0.1% to about 3%.

The toners may be alternatively produced by so-called chemical toner processes, called as well "chemically prepared toners", "polymerized toners" or "in situ toners". The toners are not produced by grinding but by controlled growth. Chemical process to be used are, among others, suspension polymerization (e.g., DE 4202461, DE 4202462); emulsion aggregation (e.g., U.S. Pat. No. 5,604,076, issued on Feb. 18, 1997); micro-encapsulation (e.g., DE 10011299); dispersion (e.g., U.S. Publication No. 2003/0087176 A1, published on May 8, 2003); or chemical milling (e.g., proceedings of IS&T NIP 17: International Conference on Digital Printing Technologies, IS&T: The Society for Imaging Science and Technology, 7003 Kilworth Lane, Springfield, Va. 22151 USA ISBN: 0-89208-234-8, p.

345). The disclosures of al the above references are hereby incorporated by reference thereto.

In a further development of the present invention, the pigment is made platelet shaped. This is particularly advantageous for its adduction to a surface of a (larger) toner material particle.

Preferably, the metallic pigment can be coated with the silicate with the aid of a so-called sol-gel process. This can provide a particularly thin coating. It can be envisaged to this end to use stearic acid as lubricant and/or that the pigment is dispersed in a mixture of ethanol, water and a silica, titania, or aluminia precursor. The silica precursor may be tetraethoxysilanes. The quantity of the salines may of course be dependent on the particle size of the pigment. Preferably, a catalyst is used in addition.

In a further embodiment, the mixture is heated to speed a reaction in which the silica, titania, or aluminia precursor is hydrolyzed and reacts to form a silicate, titanate, or aluminate, which deposits as a thin film on the pigment. A filtration may then be carried out to filter off undesirable by-products, for example the catalyst, metal compounds, or stearic acid.

It is possible to carry out drying and evaporation of solvent residues to achieve a pulverulent residue as a substance, which contains the silicate-coated pigment.

Preferably, the silicate, titanate, or aluminate comprises about 2% to about 10% of the weight of the metallic pigment.

The toner material can be clear/colorless or transparent or have an inherent color. When the toner material has an inherent color, this can lead to interesting color-varying effects with the metallic hue in a print or change the metallic hue as a whole.

The invention, and its objects and advantages, will become more apparent in the detailed description of the preferred embodiments presented below.

DETAILED DESCRIPTION OF THE INVENTION

In a preferred embodiment of the process according to the present invention, the pigment is about 7 μm in size and toner particles of the toner material are about 6-12 μm in size. As mentioned earlier, pigments may each be disposed on one surface of a toner particle of the toner material.

The organic layer may include or consist of a polymer. Useful polymers include vinyl polymers, such as homopolymers and copolymers of styrene. Styrene polymers include those containing 40 to 100 percent by weight of styrene, or styrene homologs, and from 0 to 40 percent by weight of one or more lower alkyl acrylates or methacrylates. Other examples include fusible styrene-acrylic copolymers that are covalently lightly cross linked with a divine compound such as divinylbenzene. Binders of this type are described, for example, in U.S. Re. Pat. No. 31,072, which is incorporated in its entirety by reference wherein. Preferred binders comprise styrene and an alkyl acrylate and/or methacrylate, and the styrene content of the binder is preferably at least about 60% by weight.

Copolymers rich in styrene such as styrene butylacrylate and styrene butadiene are also useful as binders, as are blends of polymers. In such blends, the ratio of styrene butylacrylate to styrene butadiene can be 10:1 to 1:10. Ratios of 5:1 to 1:5 and 7:3 are particularly useful. Polymers of styrene butylacrylate and/or butylmethacrylate (30 to 80% styrene) and styrene butadiene (30 to 80% styrene) are also useful binders.

Styrene polymers include styrene, alpha-methylstyrene, para-chlorostyrene, and vinyl toluene. Alkyl acrylates or methylacrylates or monocarboxylic acids having a double bond selected from acrylic acid, methyl acrylate, 2-ethylhexyl acrylate, 2-ethylhexyl methacrylate, ethyl acrylate, butyl acrylate, dodecyl acrylate, octyl acrylate, phenylacrylate, methylacrylic acid, ethyl methacrylate, butyl methacrylate and octyl methacrylate and are also useful binders.

Also useful are condensation polymers such as polyesters and copolyesters of aromatic dicarboxylic acids with one or more aliphatic diols, such as polyesters of isophthalic or terephthalic acid with diols such as ethylene glycol, cyclohexane dimethanol, and bisphenols. Other useful resins include polyester resins, such as may be obtained by the co-polycondensation polymerization of a carboxylic acid component comprising a carboxylic acid having two or more valences, an acid anhydride thereof or a lower alkyl ester thereof (e.g., fumaric acid, maleic acid, maleic anhydride, phthalic acid, terephthalic acid, trimellitic acid, or pyromellitic acid), using as a diol component a bisphenol derivative or a substituted compound thereof. Specific examples are described in U.S. Pat. Nos. 5,120,631; 4,430,408; and 5,714,295, all incorporated herein by reference, and include propoxylated bisphenol—A fumarate, such as Finetone® 382 ES from Reichold Chemicals, formerly Atlac® 382 ES from ICI Americas Inc.

A useful binder can also be formed from a copolymer of a vinyl aromatic monomer with a second monomer selected from either conjugated diene monomers or acylate monomers such as alkyl acrylate and alkyl methacrylate.

The metallic pigment preferably has a gold tone. This could be achieved with genuine gold. However, it is preferable to use a pigment, which contains copper and zinc, preferably in the form of an alloy, which could thus be referred to as brass or bronze, depending on the composition. Preferably, the ratio of copper and zinc fractions in the alloy varies from about 90:10 to about 70:30. As the zinc fraction in the alloy increases, the metallically golden hue changes from a more reddish to a more yellowish or even greenish gold tone. The color of the gold tone may possibly be intensified through a controlled oxidation of the metal.

The metallic pigment could alternatively have, for example, a silver tone which could result from the pigment containing among other possibilities, aluminum.

The present invention further provides a toner for reproduction of a metallic, preferably golden or silvery, hue by a printing process, especially for electrophotography, preferably prepared by the above-described process and; distinguished by at least one particle which comprises at least one metallic pigment, which has optionally been provided with a coat of silicate, and there-over with an organic layer. The advantages of such a toner have already been described in connection with the process of the present invention. The further developments of the toner according to the present invention, which may specifically be contemplated as particular embodiments on their own or combined, envisage that the organic layer contains: at least one aliphatic acid; that the organic layer contains stearic acid, that the organic layer contains at least one amide of at least one acid, that the organic layer contains at least one salt of at least one acid, that the organic layer contains at least one olefinic material, that the organic layer contains at least one wax, that the wax is a natural wax, that the wax is a synthetic wax, that the pigment is platelet shaped, that the pigment has been coated with the silicate by a sol-gel process, that the toner is a pulverulent toner, that the silicate, titanate, or aluminate comprises about 2% to about 10% of the weight of the metallic pigment, that the pigment has been admixed to a toner material which is clear or transparent, that the pigment has been admixed to a toner material which has an inherent color, that the pigment is about 7 µm in size and that toner particles of the toner material are about 6-12 µm in size, that pigments are each disposed on a surface of a toner particle of the toner material, that the organic layer comprises a polymer, that the pigment is gold colored, that the pigment contains copper and zinc, that the pigment contains copper and zinc as constituents of an alloy, that the ratio of copper and zinc fractions in the alloy varies from about 90:10 to about 70:30, that the pigment is silver colored, and/or that the pigment contains aluminum.

The inventive toner maybe applied to a substrate by a digital printing process, preferably an electrostatic printing process, more preferably by an electrophotographic printing process as described in L. B. Schein, Electrophotography and Development Physics, $2^{nd}$ Edition, Laplacian Press, Morgan Hill, Calif., 1996 (ISBN 1-885540-02-7); or, by a coating process, preferably an electrostatic coating process, more preferably by an electromagnetic brush coating process as described in U.S. Pat. No. 6,342,273, issued on Jan. 29, 2002, the disclosure of which is hereby incorporated by reference thereto. For fixing of the toner to the surface of the substrate a contact fusing method like roller fusing may be used, or preferably a non-contact fusing method like an oven, hot air, radiant, flash, solvent, or microwave fusing.

The process of the present invention and the toner of the present invention will now be more particularly described with reference to some examples which might reveal further inventive features, but to which the present invention is not restricted in its scope.

EXAMPLE 1

A platelet-shaped brass pigment having a particle size of about 7 µm was initially provided with a silicate coating, followed by an organic coating of stearic acid. This coated pigment was then intensively mixed in various concentrations with a clear toner consisting of polymeric binder, charge control agent, and fumed metal oxide having an average particle size of about 12 µm in a high speed mixer for two minutes to obtain a toner having a brass-coated surface. The concentration of the brass pigments was varied in 2% steps from 2% to 24%.

Thereafter, these toners were mixed with a carrier, developed, and transferred to paper as usual for commercial printing. Finally, each toner was fixed on the paper surface by contactless fixation in an oven.

The quality of the gold hue was assessed by image quality experts. The minimum concentration showed a pale gold-like surface, which improved with increasing concentration of pigmentation until approximately a concentration of 14% to 16% had been reached. Surface quality deteriorated again on further increasing the pigment concentration.

EXAMPLE 2

Example 1 was repeated, except that the toner was fixed with a heated contact fixing apparatus, which comprised a hard roll surface and a Kapton film. Assessment of quality led to the same evaluation as in Example 1 up to about 14% or 16%, but this time the quality remained consistently good at higher pigment concentrations.

EXAMPLE 3

A toner was prepared by compounding with 17% of brass-pigment from Example 1 by the pigment being compounded with a polymer and a charge control agent in a two-roll mill using low shearing forces, ground, classified, and subjected to a surface treatment with silica to obtain a gold toner having an average particle size of about 8 µm. Printing samples were prepared as in Example 1. Quality testing led to a quality level as in Examples 1 and 2.

EXAMPLE 4

Example 3 was repeated except that larger shearing forces were used in the mill. The result achieved was the same as in Example 3.

EXAMPLE 5 (Comparative)

Example 3 was repeated except that the pigment used had been coated with silicate only. The result was poor quality.

EXAMPLE 6 (Comparative)

Example 4 was repeated except that the pigment used had been coated with silicate only. The result was poor quality.

EXAMPLE 7

Example 1 was repeated with clear toners having particle sizes of about 12 µm, 8 µm, and 6 µm, which were coated with 20% of pigment from Example 1. The quality level was not quite as high as with 14% to 16% pigment concentration from Example 1. The toner having a particle size of 8 µm exhibited better quality than the toner having 12 µm particle size. The toner having the particle size of 6 µm showed the best quality.

EXAMPLE 8

Example 7 was repeated using a toner having a sharp melting point, known from U.S. Publication No. 2002/0115010 A1, published on Aug. 22, 2002, for example. Its 120° C. melt viscosity was 12.4 Pa s. The quality level of print samples was again good at a particle size of about 12 µm, better at a particle size of 8 µm, and best at a particle size of 6 µm.

EXAMPLE 9

Example 8 was repeated except that a yellow toner was used instead of a clear toner. The quality level of the toner having the particle size of about 6 µm was excellent.

EXAMPLE 10

Example 9 was repeated using a magenta-colored toner. Here too the quality level of the toner having a particle size of about 6 µm was excellent. Changing the viewing angle when observing the printed sample caused the perceived color to vary somewhat between a rich gold tone and a hint of magenta.

EXAMPLE 11

Example 10 was repeated using a cyan-colored toner. In this case, the quality level of the toner having an average particle size of about 8 μm was excellent. Changing the viewing angle from about perpendicular to a flatter viewing angle when observing the printed sample caused the perceived color to change somewhat between a rich gold tone and a hint of cyan.

EXAMPLE 12 (Comparative)

A gold-colored print was simulated in toner-based four-color printing. The match was poor. If anything, a dirty yellow was obtained that was devoid of the typical metallic shine.

EXAMPLE 13

Example 1 was repeated, except that platelet-shaped brass pigment having a particle size of about 7 μm was initially provided with a silicate coating, followed by a 10% by weight organic coating consisting of bis-phenol A based polyester. This coated pigment was then intensively mixed in various concentrations with a clear toner consisting of polymeric binder, charge control agent, and fumed metal oxide having an average particle size of about 12 μm in a high speed mixer for two minutes to obtain a toner having a brass-coated surface. The concentration of the brass pigments was varied in 2% steps from 2% to 24%.

Thereafter, these toners were mixed with a carrier, developed, and transferred to paper as usual for commercial printing. Finally, each toner was fixed on the paper surface by contact-less fixation in an oven.

The quality of the gold hue was assessed by image quality experts. The minimum concentration showed a pale gold-like surface, which improved with increasing concentration of pigmentation until approximately a concentration of 14% to 16% had been reached. Surface quality deteriorated again on further increasing the pigment concentration.

EXAMPLE 14

Example 13 was repeated, except that the toner was fixed with a heated contact fixing apparatus, which comprised a hard roll surface and a Kapton film. Assessment of quality led to the same evaluation as in Example 1 up to about 14% or 16%, but this time the quality remained consistently good at higher pigment concentrations.

EXAMPLE 15

Example 13 was repeated, except that platelet-shaped brass pigment having a particle size of about 7 μm was directly provided with an organic coating consisting of bis-phenol A based polyester. The toner was fixed to the paper surface by contact-less fixation in an oven. Assessment of quality led to the same evaluation as in Example 1 up to about 14% or 16%, but this time the quality remained consistently good at higher pigment concentrations.

The invention has been described in detail with particular reference to certain preferred embodiments thereof, but it will be understood that variations and modifications can be effected within the spirit and scope of the invention.

What is claimed is:

1. A metallic pigment for use in toner, said metallic pigment composing:
   a) an organic layer selected from an aliphatic acid, an amide of at least one acid, a salt of at least one acid, an olefinic material, a natural wax, a synthetic wax, a polymer, and combinations thereof; and
   b) a coating of silicate, titanate, or aluminate in an amount of from 2% to about 10%, by weight, of said metallic pigment.

* * * * *